United States Patent [19]
Cordova

[11] Patent Number: 5,990,205
[45] Date of Patent: Nov. 23, 1999

[54] POLYVINYL-BASED KNEADING AND MOLDING PLAY COMPOSITION

[75] Inventor: Abimael Cordova, Downey, Calif.

[73] Assignee: Mattel, Inc., El Segundo, Calif.

[21] Appl. No.: 08/912,351

[22] Filed: Aug. 18, 1997

[51] Int. Cl.⁶ .............................. C08L 5/00; C08L 5/04; C08K 5/42; C08J 5/11
[52] U.S. Cl. .................. 524/55; 524/28; 524/43; 524/157; 524/312; 524/386; 524/399; 524/400; 524/503
[58] Field of Search ................. 526/57; 524/28, 524/43, 55, 386, 449, 497, 399, 400, 312, 157, 503

[56] References Cited

U.S. PATENT DOCUMENTS

| | | | |
|---|---|---|---|
| Re. 35,144 | 1/1996 | Columbus et al. | 524/55 |
| 3,105,058 | 9/1963 | Osugi et al. | 525/57 |
| 3,892,905 | 7/1975 | Albert | 525/57 |
| 4,481,326 | 11/1984 | Sonenstein | 525/57 |
| 5,157,063 | 10/1992 | Wetherell | 524/55 |
| 5,171,766 | 12/1992 | Mariano et al. | 523/218 |
| 5,262,475 | 11/1993 | Creasy | 525/57 |
| 5,284,897 | 2/1994 | Columbus et al. | 524/55 |
| 5,322,880 | 6/1994 | Columbus et al. | 524/55 |
| 5,473,005 | 12/1995 | Columbus et al. | 524/55 |
| 5,494,759 | 2/1996 | Williams et al. | 525/57 |
| 5,498,645 | 3/1996 | Mariano et al. | 524/449 |
| 5,506,290 | 4/1996 | Shapero | 524/389 |

*Primary Examiner*—Peter A. Szekely
*Attorney, Agent, or Firm*—Robert W. Mulcahy

[57] ABSTRACT

The invention is directed to a cross-linked gel-like polyvinyl-based composition of matter having unique elasticity. The composition is capable of being used as a kneading compound, as well as being moldable, stretchable, and bouncing, for use in play activities. The composition is based on a cohesive polyvinyl alcohol/polyvinyl pyrrolidone nonadhesive and substantially nondrying binder composition that is appropriate for child use. The invention is also directed to a method of making the instant polyvinyl-based composition of matter.

15 Claims, No Drawings

POLYVINYL-BASED KNEADING AND MOLDING PLAY COMPOSITION

TECHNICAL FIELD OF THE INVENTION

The present invention relates to a gel-like composition of matter for use as a play material. The present composition is capable of being used as a play gel, as well as being moldable, stretchable, and resilient to the point of having bounce characteristics. Because it is based on a polyvinyl alcohol composition, it is safe and suitable for use by children if accidentally ingested and can be washed from fabrics and carpets with water.

BACKGROUND OF THE INVENTION

Through the years, play compositions of different types have been provided by practitioners in the toy arts to amuse children and adults and to aid in the development of manual skills and dexterity, as well as creativity. While the variety of such play material compositions is virtually endless, all generally involve the use of free-forming or malleable materials, such as oil base or water base gums and gel compounds which may be manipulated and shaped by the user. Certain materials have been provided which are moldable and tend to retain their shapes, such as modeling clay or the like. Others, however, have been provided which are looser and more free-flowing, such as novelty play materials and compositions. Still others are gel-like and provide interesting characteristics, such as shaking or quivering similar to gelatin dessert products.

Regardless of the type of play compositions used, it has remained imperative that such materials be safe for young children. Safety requirements have evolved through the years as safety concerns have grown. Generally, safety requirements mandate that play material compositions be nonirritating to the skin or eyes or the like, and be nontoxic if ingested. Additional requirements have been expected of these materials to avoid damage to clothing, upholstery fabric, or carpeting.

Play compositions having molding or modeling characteristics by which a child can represent people or objects are well known and generally comprise products of mineral origin, i.e., clay products, or vegetable origin, i.e., starch products. These particular materials are, in general, nonelastic and nonstretchable over significant lengths. Additionally, these modeling clays are messy and frequently have oils and other staining ingredients which are difficult to remove from carpets and fabrics. Elastomeric silicone-based play compositions are known and are essentially designed to be stretched, as well as to be rolled into a ball which has a high degree of elasticity or "bounce" under suddenly applied stress. However, silicone-based modeling compositions or puttys are generally known to have an unpleasant feel and have limited stretch capabilities, thereby limiting the material to a narrow field of play activity. Moreover, silicone puttys cannot be readily removed from fabric and carpets and, therefore, are not preferred materials for use by children.

Polyvinyl-based play compositions are known in the art as being child-user friendly. Specifically, polyvinyl alcohol has been found to be harmless if accidentally ingested, has no unpleasant odor or feel, and is readily removable from carpet or fabrics. However, most polyvinyl-based play or modeling compositions require the use of fillers to give physical integrity to the materials so as to enable the retention of detail or shape. Such polyvinyl-based play compositions are not elastic enough for ductility or stretchability and have minimal resiliency and bounce.

Recognizing the need to provide a more versatile play material, the present invention was configured. Specifically, there was significant interest in providing a play material that is kneadable, moldable, and elastic; that can be used for long periods of time without drying to the point that it becomes unusable; that would not be harmful if accidentally ingested; and that exhibits a bright, glistening and shiny colorful appearance with no unpleasant odor. It was further sought to have a play material that has bounce characteristics and is stretchable; which can be cleaned up and removed from carpets and fabrics with water; and which can be molded and retain detail until it is reformed. It was also important to produce a composition exhibiting all of the above properties while being moderate in cost.

SUMMARY OF THE INVENTION

The discovery of the present invention is that one may formulate a superior elastic modeling play composition by combining a binder comprised of a water-soluble polyvinyl polymer mixture of polyvinyl alcohol and polyvinyl pyrrolidone, a cross-linking agent (gellant), and water in certain amounts to form a molding or modeling composition of completely unexpected character in that it possesses an exceptional elasticity and flexibility. The molding play composition has sufficient elasticity to enable it to bounce, is very ductile (but which can prove brittle if pulled sharply) and yet can flow and stretch under its own weight. The play composition of the present invention has the additional qualities of being pleasant to the touch with no tendency to stick to the hands and retains water content (hence, minimal shrinkage) over a relatively long period of time.

More specifically, the present invention relates to a composition which is designed to be used as an elastic molding play material and is achieved by the immobilization of an aqueous solution of a polyvinyl composition comprised of polyvinyl alcohol and polyvinyl pyrrolidone with a cross-linking agent such as sodium borate (borax), wherein the cross-linking agent is used in a weight ratio relative to the polyvinyl binder of 1:5 to 1:10. Certain quantities of a hydrophilic solid gel, such as a polysaccharide gum (xantham gum, guar gum, or gelatin) are then added to the polyvinyl-based immobilized gel to plasticize the polyvinyl composition and generate the elastic features of the instant play materials. The polysaccaride gum is preferably combined with other additives which improve the consistency of the gel and its plasticity.

In one preferred form, a polymeric kneadable and molding composition is comprised of a polyvinyl binder having from about 10 to 30% by weight of a water-soluble polyvinyl alcohol of an average molecular weight of about 93,400 and of a grade having from about 85 to 90% degrees of hydrolysis, and from about 0.5 to 4% by weight polyvinyl pyrrolidone. The composition further includes 20 to 30% by weight of an emollient and humectant, 0.5 to 4% by weight of a cross-linking agent, approximately 1 to 5% of an aqueous or organo-soluble thickener, and from 50 to 65% by weight of water.

Even more precisely, the present invention is directed to an elastic kneading and molding composition comprising from about:

a) 10 to 34% by weight of a water-soluble polyvinyl-based binder comprised of polyvinyl alcohol and polyvinyl pyrrolidone;

b) 0.5 to 4% by weight of a cross-linking agent;

c) 20 to 30% by weight of an emollient and humectant;

d) 1 to 5% of a polysaccharide gum thickener; and e) 50 to 65% water.

The present elastic kneading and molding composition is prepared by:
a) mixing a polyvinyl-based polymer and water at an elevated temperature, to form a solution;
b) adding a premixed solution of polyvinyl pyrrolidone, a humectant, and a polysaccharide gum slowly to the polyvinyl polymer solution with agitation, and mixing to form a homogeneous mixture; and
c) adding sufficient amounts of a cross-linking agent to the solution, and mixing until a firm elastic compound is formed.

DETAILED DESCRIPTION OF THE INVENTION

The present composition is the combination of a number of ingredients which synergistically provide for the desirable properties of the instant invention recited above. Specifically, it is contemplated that an exemplary composition contains a polyvinyl binder comprised of about 10 to 30% by weight water-soluble polyvinyl alcohol which is of an average molecular weight of about 93,400 and is of a grade having 85 to 95% degrees of hydrolysis. It has been determined that a low molecular weight polyvinyl alcohol tends to make a composition more moldable and extrudable. By contrast, a high molecular weight polymer makes the composition more stretchy and elastic. As such, a blend of molecular weights of an average of about 93,400 provides the ability to perform a multitude of activities. In this regard, it is contemplated that the preferred embodiment of the present invention include approximately 18% by weight of the polyvinyl alcohol with the cited average molecular weight. The polyvinyl alcohol is combined with about 0.5 to 4% polyvinyl pyrrolidone to form a polyvinyl-based binder which is unique in its characteristics. It is well to note that while an exemplary composition herein contains polyvinyl alcohol having an average molecular weight of about 93,400, higher or lower average molecular weights of polyvinyl alcohol can be employed to generate the instant distinctive moldable play composition.

In addition to the polyvinyl-based binder, the present play molding composition also employs between 0.5 to 4% by weight of a cross-linking agent. The present composition also includes 50 to 65% by weight water and 20 to 30% by weight of an emollient and humectant such as glycerine, polyglycol, and/or polypropylene glycol. The cross-linking agent can be a boron oxide type such as boric acid, borax, zinc borate, sodium borate, sodium tetraborate-decahydrate, or a zirconium salt, such as potassium zirconium carbonate, zirconate (2-), bis[carbonate(2-)-O]dihydroxy-diammonium. Finally, the present invention contemplates the use of an aqueous or organo-soluble thickener such as guar gum, hydroxypropyl cellulose, hydroxyalkyl guar, propylene glycol alginate, gum karaya, and similar materials, in an amount of from 1 to 5% by weight.

The present composition is based upon a water-soluble polyvinyl alcohol base polymer of average molecular weight in combination with specific amounts of polyvinyl pyrrolidone which provides hydrogen bonding of the alcohol moieties of the base polymer, and, in combination with the other ingredients herein described produces a play gel material which is virtually unlimited in its application, as the play material is kneadable, moldable, stretchable, bouncing, nondrying, and nontoxic.

As noted, the present invention is directed to an elastic polymeric moldable composition of matter which remains moldable and kneadable throughout its effective life. In achieving these characteristics, it is imperative that the amount of water lost during play or storage be insignificant in comparison to the effect that the humectant has upon the composition. In effect, the emollients contemplated for use herein provide body to the polyvinyl alcohol cross-linked gel and function as plasticizers to maintain the soft stretch quality of the composition. Humectants prevent the loss of water to any significant extent so that the user may reconstitute the mass to its original softness merely by wetting one's hands with water. High levels of humectant make the mass receptive to the addition of a small amount of water lost during play while retaining the essential nondrying character of the composition.

The instant play material contemplates using an amount of water necessary to achieve a pleasant, smooth, nonstick feel and elasticity in the instant flexible polymeric play material of the instant invention. The minimum amount of water is 50% by weight, while the maximum water content is 65% by weight. Water content below the minimum renders the composition too dry with loss of stretchability, while water in excess of 65% renders the material free-flowing and gooey. Equally important is the amount of cross-linking agent and thickener to help maintain a minimum water level to sustain the unique stretch and bounce characteristics of the present moldable and kneadable polymer composition. To further prevent drying of the instant elastic composition, it is necessary that between 20 to 30% by weight of a humectant be present. It is the combination of all these ingredients in their cited quantities which generates a moldable and kneadable elastic play gel polymer composition having unique stretch and bounce characteristics. While the instant composition is moldable, it is well to note that its prime function is that of a play gel because of its cold-flow properties; that is, the play material can be kneaded and shape-molded but will lose shape over a short period of time due to its slow flow (or cold flow) properties. In that sense, the instant composition cannot be dry-molded as can a molding dough or clay.

It is also contemplated that a preservative be employed in amounts of up to 3% by weight. As such, 0.1 to 2% by weight of a suitable preservative, such as imidazolidinyl urea, diazolidinyl urea, 1-(3chloroallyl)-3,5,7-triaza-1-azoniaadamantane chloride which is sold by the Dow Chemical Company under the trademark Dowicil 200 can be incorporated in the present composition. Additionally, salts such as sodium carbonate can be employed as preservatives.

It is within the purview of the present invention to employ a very small amount of lubricant or slip agent which acts as a process aid in combining the various ingredients. Suitable lubricants include mineral oil, paraffin, amide wax or oxidized polyethylene wax in an amount of up to 2% by weight. Finally, a suitable pigment or dye is preferably employed in the present elastic composition to enhance its entertainment or play effect. Without the pigment or dye, the composition is basically translucent while with up to 6% by weight of a suitable pigment or dye the play material can be made to take on an array of vivid colors which are magnified by the stretch characteristics of the elastic polymer composition. Typical pigments and colorants include synthetic organic colorants sold as the T-series by the Day Glow Corporation of South Gate City, Calif. Other pigments which can be used include sodium aluminum sulpho silicate sold as MR 582 by the Cleveland Pigment Corp. of Cleveland, Ohio; polyamide condensates with organic dyes with less than 2% phthalocyanine; and tetra-chloro-zincate sold by the Day Glow Corporation.

It is further well to note that the instant elastic play composition employs no filler or structural additive and is distinctive in that regard. The cohesiveness of the play gel material is achieved through the combination of ingredients in the cited amounts herein. The addition of filler to the instant composition would lessen or destroy the elasticity of the composition, thereby negatively affecting the stretchability or bounce characteristics necessary to the instant compositional invention. Prior art polyvinyl-based binder materials have generally required fillers for structural integrity and, hence, moldability.

It is further contemplated that the instant composition employ "pearlescing" agents to achieve a cosmetically attractive pearl-like appearance known as pearlescence. Pearlescing agents that may be used include mica, titanium dioxide, stearic acid and insoluble metal salts thereof, such as magnesium stearate or zinc stearate, glyceryl stearate, ethylene glycol mono- and di-stearates, polyethylene glycol distearate, glycol amidostearate, less soluble surfactants having a high cloud point, such as ($C_{16}$–$C_{18}$) allyl glyceryl ether sulfonates, certain fatty alkanolamides, and even insoluble resin latex dispersions. Preferred materials for the present composition are mica and titanium dioxide sold under the trademark "Timica Sparkle," "Mearlin Sparkle," and "Flamenco Red," distributed by the Mearl Co. (PCH Co.) of Los Angeles, Calif. The amount of pearlescent agent in the instant elastic composition is preferably from 0.5 to 2% by weight. The attractiveness of the instant composition is greatly enhanced by the use of the pearlescent agents.

A particularly useful composition was prepared having the following ingredients:

| Ingredient | Percent by Weight |
| --- | --- |
| Water | 50% |
| Polyvinyl alcohol | 18% |
| Polyvinyl pyrrolidone | 2% |
| Propylene glycol | 16% |
| Borax | 3% |
| Pigment | 3% |
| Preservative | 3% |
| Thickener | 2% |
| Masking agents, preservatives, and pigments | 3% |

The instant invention includes a process for producing the composition, which process is set forth in the flow diagram of Table 1. The basic material is formed of polyvinyl alcohol which is dissolved in water to form a liquid solution. Since the purpose of this invention is to make a substantially nondrying mixture, a certain amount of water must be used in combination with a certain amount of cross-linking agent and thickener so as to ensure that any loss by evaporation from the final product during play by the end user will be a minor part of the total composition. Specifically, the process begins with the slow addition, with agitation, of polyvinyl alcohol into a measured amount of distilled water generally at room temperature or cooler in a turbine homogenizer. After the addition of the polyvinyl alcohol and mixing, the temperature of the aqueous solution is raised to between 185° F. to 200° F. and held in that temperature range for approximately thirty minutes with complete mixing.

In a separate "Cowles" mixer container, suitable quantities of glycerine and guar gum thickener are premixed. An appropriate amount of propylene glycol is admixed to the glycerine solution. This premix solution is then added to the main aqueous polyvinyl alcohol solution. Before adding the glycerine/propylene glycol solution to the main polyvinyl alcohol solution, appropriate lubricants (such as wax and/or dispersants) may be added to this premixture before addition to the main polyvinyl alcohol solution. Additionally, a discrete quantity of polyvinyl pyrrolidone is added directly to the main polyvinyl alcohol solution.

TABLE 1

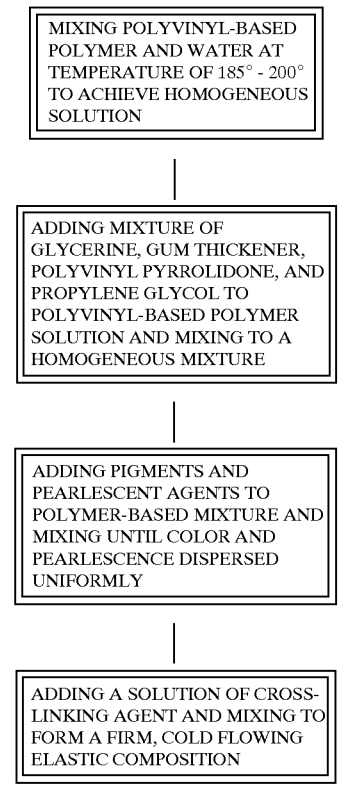

It is noted that polyvinyl alcohol of low molecular weight will dissolve in water to approximately 20 to 30% solids and high molecular weight to about 7% solids. It is considered important to dissolve the polyvinyl alcohol in water without other ingredients competing for the water. Elevating the temperature of the aqueous solution of polyvinyl alcohol to from 185° to 200° F. while mixing slowly for thirty minutes, or until no dissolved polyvinyl alcohol is visible in a sample determination, is conducted prior to adding the premixed glycerine/propylene glycol solution. The emollients and humectants (glycerine/polypropylene glycol solution) which are premixed must also be warmed to approximately 200° F., particularly if there are any solids in the mixture. Mixing is continued until these various components form a homogeneous mixture before adding same to the polyvinyl alcohol solution.

The polyvinyl-based mixture so prepared is cooled to room temperature and a premixture of pigment, masking agents, pearlescent material, and preservative are added and mixed until color is dispersed uniformly and a homogeneous composition is achieved.

To the color mixture is added a cross-linking agent in certain incremental amounts with mixing until a firm kneadable homogeneous compound is achieved. In the subject composition it is important 1) that polyvinyl pyrrolidone be used in the base binder in amounts not exceeding 4% by weight, and 2) that the cross-linking or gelling agent be added incrementally in amounts not exceeding 4% by weight of the total composition. Otherwise, the characteristics cited for the instant play material will not be achieved.

The present invention teaches a substantially nondrying plastic moldable composition. The novelty of this invention is rooted in the use of a polyvinyl thermoplastic polymer binder, e.g., polyvinyl alcohol in combination with a lesser amount of polyvinyl pyrrolidone. The polyvinyl-based binder mixture is miscible when dissolved in certain amounts of water and polyol materials, such as glycols and polyglycols; and, further, gels when combined with critical amounts of cross-linking agents (gellants). In general, the polyol materials can function primarily as flexibilizing (plasticizing) agents, as lubricants, or as humectants. A humectant is generally regarded as a material whose primary ability is to retain water and aggressively take on water from the air or its environment in the compound. The present composition is intended to strongly retain water.

The viscosity of the present formulary can be varied by varying the viscosity of various ingredients, such as propylene glycol which is used in its liquid state, to solids, such as Carbowax (polyethylene glycol) distributed by Union Carbide, Corp. The functionality of the instant play gel as a stretchable and bouncing play gel composition demands that only certain amounts of polyols be employed as humectants, emollients, or humectants.

Because the present invention relies strongly on cross-linking and hydrogen bonding of the alcohol moieties of the polyvinyl alcohol by the cross-linking agent and the polyvinyl pyrrolidone to hold the water, the range of functionality in compatible materials which can be selected and appropriated to contribute lubricity, stretch, stiffness, water retention, and emollients, as well as clarity and other qualities as needed, is exceedingly important. Certain polyglycols, such as solid polyethylene glycols, glycol di-2-ethylhexanoate, for example, can also function as softening agents or emollients or plasticizers. An emollient is regarded as a material whose primary ability or attribute is to soften or plasticize. It can soften the polymeric molding compound but also be regarded as the material that softens and is soothing to the hands. Materials such as castor waxes have some hydroxyl functionality and are unquestionably excellent emollients, as well as lubricants, but are not generally regarded as humectants, and are unacceptable herein.

It is noted that the present nondrying plastic moldable composition is quite polar. In order to enhance the release of this composition from polar surfaces, such as user's hands, it is deemed necessary to include a nonpolar lubricant which is a material that exudes to the surface of the composition because of its nonpolar incompatibility. As such, care must be taken when using such lubricants as mineral oil or petroleum to avoid incorporating an amount that will leave an oily or greasy residue on one's hands and other surfaces, or destroy the critical compositional balance between the polyvinyl alcohol, the cross-linking agent, and the humectant in the instant composition.

The compositions of the present invention possess a unique combination of properties, including both a high degree of elasticity or "bounce" under suddenly applied stresses, and a high degree of plasticity when the stress is applied more slowly. Some of these compositions have pronounced cold flow properties in that a ball of this material will flow out into a thin disc in the course of hours. They do not flow appreciably under a rapid blow, but will flow readily under the application of a low, steady pressure. Other properties include excellent stability throughout a very wide temperature range. Thus, as a base for an unusual novelty composition, it has application for use by children, both indoors and outdoors in all climates and seasons. Most importantly, the polyvinyl-based polymer component of these novel compositions are nontoxic and, therefore, are safe for use by children of all ages.

Having thus described the principals of the invention, together with illustrative embodiments thereof, it is to be understood that although specific terms are employed, they are used in a generic and descriptive sense and not for the purpose of limitation, the scope of the invention being set forth in the following claims.

What is claimed:

1. A polymeric composition of matter consistently essentially of from about 10 to 30% by weight of polyvinyl alcohol, 0.5 to 4% by weight polyvinyl pyrrolidone, 20 to 30% by weight of an emollient and humectant, 0.5 to 4% by weight of a cross-linking agent, 1 to 5% of a polysaccharide gum thickener, and 50 to 65% water, said composition being moldable, kneadable, stretchable, resilient to sudden applied stress, and moisture retentive throughout its effective life.

2. The polymeric composition of claim 1 further consisting of from 0.1 to 2% by weight of a preservative.

3. The polymeric composition of claim 2 wherein the preservative comprises a member selected from the group consisting of imidazolidinyl urea, diazolidinyl urea, 1-(3chloroallyl)-3,5,7-triaza-1-azoniaadamantane chloride, and sodium carbonate.

4. The polymeric composition of claim 1 further consisting of up to 2% by weight of a pearlescent agent.

5. The polymeric composition of claim 4 wherein said pearlescent agent is selected from the group consisting of sulfonates, stearates, mica and titanium dioxide.

6. The polymeric composition of claim 1 wherein said humectant comprises a member selected from the group consisting of glycerine, polyglycol, and propylene glycol.

7. The polymeric composition of claim 1 wherein said cross-linking agent comprises a member selected from the group consisting of boric acid, borax, zinc borate, sodium borate, and potassium zirconium carbonate.

8. The polymeric composition of claim 1 further consisting of up to 2% of a lubricant comprising a member selected from the group consisting of mineral oil, paraffin, amide wax, and oxidized polyethylene wax.

9. The polymeric composition of claim 1 wherein said aqueous or organo-soluble thickener comprises a member selected from the group consisting of guar gum, hydroxypropyl cellulose, hydroxyalkyl guar, propylene glycol alginate and guar karaya.

10. A kneading and modeling composition consisting essentially of from about:
   a) 10 to 34% by weight of a water-soluble polyvinyl-based binder comprised of polyvinyl alcohol and polyvinyl pyrrolidone;
   b) 0.5 to 4% by weight of a cross-linking agent;
   c) 20 to 30% by weight of an emollient and humectant;
   d) 1 to 5% of a polysaccharide gum thickener; and
   e) 50 to 65% water.

11. The composition of claim 10 wherein the polyvinyl alcohol is present in an amount of 18% and the polyvinyl pyrrolidone is present in an amount of 2%.

12. The composition of claim 10 wherein said cross-linking agent comprises a member selected from the group consisting of boric acid, borax, zinc borate, sodium borate, and potassium zirconium carbonate.

13. A method of making a kneadable and moldable polymer composition consisting essentially of a matrix mixture of water-soluble polyvinyl alcohol, polyvinyl pyrrolidone, a humectant, and a cross-linking agent comprising:

a) mixing the polyvinyl base polymer in water at temperatures of from about 185° C. to about 200° C. to obtain an aqueous solution of the polyvinyl alcohol;

b) admixing from about 0.3 to 4% polyvinyl pyrrolidone and from about 20 to 30% by weight of a humectant material in the polyvinyl-based polymer solution to form a homogeneous mixture; and c) adding a solution of a cross-linking agent to the homogeneous mixture and agitating the mixture to form a firm elastic composition.

14. The method of claim 13 further comprising the step of adding a colorant.

15. The method of claim 14 further comprising the step of adding a pigment and pearlescent agent to the homogeneous mixture prior to addition of the cross-linking agent.

* * * * *